United States Patent [19]

Hills

[11] 4,006,032
[45] Feb. 1, 1977

[54] PROCESS FOR REMOVING OFF-FLAVOR FROM MAPLE SIRUP

[75] Inventor: Claude H. Hills, Flourtown, Pa.

[73] Assignee: The United States of America as represented by the Secretary of Agriculture, Washington, D.C.

[22] Filed: Jan. 30, 1976

[21] Appl. No.: 653,794

[52] U.S. Cl. .............................. 127/46 A; 210/24; 426/271
[51] Int. Cl.² .......................................... C13D 3/14
[58] Field of Search .......... 127/46 A; 426/48, 271; 210/24

[56] References Cited
UNITED STATES PATENTS 3,205,076  9/1965  Wasserman ...................... 426/48

OTHER PUBLICATIONS

J. B. Wilson, JAOAC, 33 (4), 995–1002 (1950).
A. E. Wasserman et al., Food Technology, vol. XV, No. 10, 438–439 (1961).
J. C. Kissinger, National Maple Syrup Digest, vol. 4, No. 4, 10–11 (1965).
"Ion Exchangers in Org. & Biochem.", C. Calmon et al., eds., 597, 601, Interscience, N. Y., 1957.

Primary Examiner—Joseph Scovronek
Assistant Examiner—Sidney Marantz
Attorney, Agent, or Firm—M. Howard Silverstein; William E. Scott; David G. McConnell

[57] ABSTRACT

Off-flavor in maple sirup made from buddy sap or from good sap contaminated with buddy sap is removed by passing the sirup through a bed or column of ion exchange resin.

16 Claims, No Drawings

PROCESS FOR REMOVING OFF-FLAVOR FROM MAPLE SIRUP

This invention relates to a process for improving the flavor of buddy maple sirup and more particularly, to a process for removing the off-flavor usually found in maple sirup prepared from buddy maple sap.

Maple sap collected late in the season as the trees begin to bud produces sirup that has an objectionable flavor which makes it unpalatable. This sirup is commonly called "buddy." When a producer notes the appearance of buddy sap, he stops collecting it. However, some trees may produce buddy sap earlier than other trees in the same general locality, thereby, contaminating good sap. If sirup made from contaminated sap is of such quality as to be unmarketable, the contamination represents a substantial economic loss to the producer. In order to avoid such contamination and its attendant economic loss, maple sirup producers have an urgent need for a direct process for removing off-flavors in sirup made from buddy sap.

Therefore, it is an object of this invention to provide a simple, easily applied process for removing off-flavors from sirups made from buddy maple sap.

Another object is to provide a process for removing off-flavors from sirups made from maple sap contaminated with buddy sap.

Still another object is to provide maple sirup producers with a means of extending the sap collecting season.

A still further object is to provide maple sirup producers with a means of avoiding financial disaster caused by the production of unpalatable sirup.

According to the present invention the above objects are accomplished by a process wherein maple sirup made from buddy sap or from good sap contaminated with buddy sap is passed or trickled through a bed or column of ion-exchange resin and the effluent concentrated, if necessary, to the proper density.

Although maple sirup producers have encountered the off-flavor problem for many, many years, there is currently only one method available for removing this so-called buddy flavor from the sirup. This method involves fermentation of the sirup with the microorganism, *Pseudomonas geniculata*. However, this process is too complex and expensive for general commercial usage.

In the process of the present invention, cation or anion-exchange resins, singly or in series, may be used. When the resin is exhausted, it can be regenerated and reused. In order to serve the purpose of the invention, the cation must be in the $H^+$ form and the anion resin must be the $OH^-$ form. The process is applicable to both undiluted and aqueous diluted maple sirup. Dilutions of 1:2, 1:4, and 1:10, maple sirup/water, have been successfully used with this invention.

The rationale for the success of this invention is not known and much work would be required to determine why it works. Maple sap contains mostly sucrose with trace amounts of fructose, glucose, malic acid and amino acids. The nature and number of amino acids is not known. Presumably, when sap is subjected to prolonged heating in order to make sirup, chemical reactions occur and products other than those found in the original sap are formed. The nature of these reactions and of the products formed has not been determined.

While working on this problem I found that the process, in addition to removing off-flavor, also removes amino acids from the sirup. However, I also found that the amount of amino acid removed from various sirups varies widely and that the amount removed does not affect the removal of off-flavors, adversely or otherwise. Consequently, I have concluded that although my process removes at least some of the amino acids from the sirup, the success of the process in removing off-flavor does not depend on the removal of all or any particular amount of amino acids. In other words removal of amino acids from the sirup is not essential to the success of my process.

The invention is illustrated by the following examples.

EXAMPLE I

Buddy maple sirup, diluted 1:2 with water, was run through a one-inch glass column containing 150 ml. of a cation resin, Amberlite 252, a sulfonated copolymer of styrene and divinyl benzene at the rate of 150 ml. per 4 minutes. Each 150 ml. of effluent was neutralized to pH 6.5 to 7.0 and evaporated to a sirup of 66° Brix. Sirups made from effluents 1 to 18 were free of off-flavor. Sirup made from effluent 19 was not free of off-flavor which indicated that the resin was saturated. The resin was regenerated with dilute HCl and reused. Two other cation exchange resins, Amberlite 200 and Dowex 50WX8, each of which is a sulfonated copolymer of styrene and divinyl benzene, produced similar results.

EXAMPLE II

Buddy maple sirup was diluted 1:2 with water and run through a 1 inch glass column containing 150 ml. of an anion resin, Dowex 11, a polymer of trimethylbenzyl ammonium, at the rate of 150 ml. per 4 minutes. Each 150 ml. sample of effluent was neutralized to pH 6.5 to 7.0 and evaporated to a sirup of 66° Brix. Sirups made from effluents 1 to 20 were free of off-flavor. Sirups from following effluents were not free of off-flavor indicating the resin was saturated after the 20th effluent. The column was regenerated with dilute NaOH and reused. Two other anion resins, IRA-190 and IRA-900, both of which are quaternary ammonium copolymers of styrene and divinyl benzene, gave similar results.

EXAMPLE III

Buddy sirup was diluted 1:2 with water and run through a 1 inch glass column containing 150 ml. of the anion resin of Example II and then through a 1 inch glass column containing 150 ml. of the cation resin of Example I.

The percolation rate was 150 ml. per 4 minutes. Although the capacity of these two resins in series was only slightly better than either of the resins used singly, other combinations of resins may prove to be far more effective than either one of the resins used singly. Also, some buddy sirups may require the use of such a system, that is, an anion exchange resin and a cation exchange resin, or vice versa, in series, in order to remove all of the unpalatable off-flavor.

I claim:

1. A process for removing off-flavor from maple sirup made from buddy sap and from maple sirup made from sap contaminated with buddy sap comprising passing the sirup through a bed of ion exchange resin.

2. The process of claim 1 wherein the ion exchange resin is a cation exchange resin.

3. The process of claim 2 wherein the cation exchange resin is a sulfonated copolymer of styrene and divinyl benzene.

4. The process of claim 1 wherein the ion exchange resin is an anion exchange resin.

5. The process of claim 4 wherein the anion exchange resin is a polymer of trimethylbenzyl ammonium.

6. The process of claim 4 wherein the anion exchange resin is a quaternary ammonium copolymer of styrene and divinyl benzene.

7. The process of claim 1 wherein the ion exchange resin is a combination of cation and anion exchange resins, said resins being separated and in series.

8. The process of claim 7 wherein the cation exchange resin is a sulfonated copolymer of styrene and divinyl benzene and the anion exchange resin is a polymer of trimethylbenzyl ammonium.

9. A process for removing off-flavor from maple sirup made from buddy sap and from maple sirup made from good sap contaminated with buddy sap comprising diluting said sirup with water and passing the diluted sirup through a column of ion exchange resin selected from the group consisting of cation exchange resin, anion exchange resin, and a combination of cation and anion exchange resins in series.

10. The process of claim 9 wherein the dilution ratio of sirup to water is 1:2.

11. The process of claim 9 wherein the dilution ratio of sirup to water is 1:4.

12. The process of claim 9 wherein the dilution ratio of sirup to water is 1:10.

13. The process of claim 10 wherein the ion exchange resin is a sulfonated copolymer of styrene and divinyl benzene.

14. The process of claim 10 wherein the ion exchange resin is a polymer of trimethylbenzyl ammonium.

15. The process of claim 10 wherein the ion exchange resin is a combination of a polymer of trimethylbenzyl ammonium resin and a sulfonated copolymer of styrene and divinyl benzene resin, said resins being separated and in series.

16. A process for preparing a palatable maple sirup from unpalatable sirup made from buddy sap and from sap contaminated with buddy sap comprising passing the unpalatable sirup through an ion exchange resin.

* * * * *